(12) United States Patent
Solihin

(10) Patent No.: US 10,445,287 B2
(45) Date of Patent: Oct. 15, 2019

(54) CIRCUIT SWITCH PRE-RESERVATION IN AN ON-CHIP NETWORK

(71) Applicant: EMPIRE TECHNOLOGY DEVELOPMENT LLC, Wilmington, DE (US)

(72) Inventor: Yan Solihin, Raleigh, NC (US)

(73) Assignee: Empire Technology Development LLC, Wilmington, DE (US)

( * ) Notice: Subject to any disclaimer, the term of this patent is extended or adjusted under 35 U.S.C. 154(b) by 278 days.

(21) Appl. No.: 14/400,557

(22) PCT Filed: Sep. 12, 2013

(86) PCT No.: PCT/US2013/059335
§ 371 (c)(1),
(2) Date: Nov. 12, 2014

(87) PCT Pub. No.: WO2015/038120
PCT Pub. Date: Mar. 19, 2015

(65) Prior Publication Data
US 2015/0331831 A1 Nov. 19, 2015

(51) Int. Cl.
*G06F 15/167* (2006.01)
*H04L 12/773* (2013.01)
(Continued)

(52) U.S. Cl.
CPC ........ *G06F 15/167* (2013.01); *G06F 15/7825* (2013.01); *H04L 45/60* (2013.01);
(Continued)

(58) Field of Classification Search
CPC .... G06F 13/28; G06F 15/167; G06F 15/7825; H04L 45/60; H04L 49/109; H04L 49/253
(Continued)

(56) References Cited

U.S. PATENT DOCUMENTS 6,226,263 B1 * 5/2001 Iwase ................. H04Q 11/0478
370/231
6,854,059 B2 2/2005 Gardner
(Continued)

FOREIGN PATENT DOCUMENTS

CN 101189843 A 5/2008
CN 101485162 A 7/2009
(Continued)

OTHER PUBLICATIONS

Shekhar Borkar et al., "The Future of Microprocessors", Communications of the ACM, May 2011, pp. 67-77, vol. 54, No. 5.
(Continued)

*Primary Examiner* — Umar Cheema
*Assistant Examiner* — Anh Nguyen

(57) ABSTRACT

Techniques described herein generally include methods and systems related to circuit switching in a network-on-chip. According to embodiments of the disclosure, a network-on-chip may include routers configured to pre-reserve circuit-switched connections between a source node and a destination node before requested data are available for transmission from the source node to the destination node. Because the circuit-switched connection is already established between the source node and the destination node when the requested data are available for transmission from the source node, the data can be transmitted without the delay or with reduced delay caused by setup overhead of the circuit-switched connection. A connection setup message may be transmitted together with a memory request from the destination node to facilitate pre-reservation of the circuit-switched connection.

29 Claims, 9 Drawing Sheets

(51) Int. Cl.
  *H04L 12/933* (2013.01)
  *G06F 15/78* (2006.01)
  *H04L 12/937* (2013.01)

(52) U.S. Cl.
  CPC .......... *H04L 49/109* (2013.01); *H04L 49/253* (2013.01); *Y02D 10/12* (2018.01); *Y02D 10/13* (2018.01)

(58) Field of Classification Search
  USPC ........................................................ 709/212
  See application file for complete search history.

(56) References Cited

U.S. PATENT DOCUMENTS

| | | | |
|---|---|---|---|
| 7,570,952 B2 | 8/2009 | Woxberg et al. | |
| 8,284,766 B2* | 10/2012 | Anders | G06F 15/17375 370/354 |
| 8,327,187 B1 | 12/2012 | Metcalf | |
| 2007/0047444 A1 | 3/2007 | Leroy et al. | |
| 2009/0142055 A1* | 6/2009 | Qiu | H04J 14/0227 398/45 |
| 2009/0245257 A1* | 10/2009 | Comparan | H04L 45/00 370/392 |
| 2009/0252171 A1* | 10/2009 | Kumar | H04L 45/00 370/397 |
| 2012/0002675 A1* | 1/2012 | Kauschke | H04L 45/06 370/400 |
| 2012/0008620 A1 | 1/2012 | Urzi et al. | |
| 2013/0148506 A1* | 6/2013 | Lea | H04L 47/32 370/236 |
| 2013/0308549 A1* | 11/2013 | Madan | H04W 28/26 370/329 |
| 2014/0119363 A1* | 5/2014 | Solihin | H04L 49/109 370/352 |
| 2015/0220470 A1* | 8/2015 | Chen | H04L 49/109 710/105 |

FOREIGN PATENT DOCUMENTS

| | | |
|---|---|---|
| CN | 102368739 A | 3/2012 |
| JP | 2004515090 A | 5/2004 |

OTHER PUBLICATIONS

Natalie Enright Jerger et al., "Circuit-Switched Coherence", Proceedings of the Second ACM/IEEE International Symposium on Networks-on-Chip, NOCS '08, Apr. 2008, pp. 193-202.

International Search Report and Written Opinion of the International Searching Authority, International application No. PCT/US2013/059335, dated Dec. 17, 2013.

Angelo Kuti Lusala et al., "A Hybrid Router Combining SDM-Based Circuit Switching with Packet Switching for On-Chip Networks", 2010 International Conference on Reconfigurable Computing and FPGAs (ReConFig), Dec. 13-15, 2010, pp. 340-345.

Neng-Chung Wang et al., "RSVP Extensions for Real-Time Services in Heterogeneous Wireless Networks", Department of Computer Science and Information Engineering, Chaoyang University of Technology, Jul. 2006, pp. 1-56.

Zhenqiang Ye et al., "Predictive Channel Reservation for Handoff Prioritization in Wireless Cellular Networks", Computer Networks: The International Journal of Computer and Telecommunications Networking, Feb. 21, 2007, pp. 798-822, vol. 51, Issue 3.

* cited by examiner

CIRCUIT SWITCH PRE-RESERVATION IN AN ON-CHIP NETWORK

CROSS-REFERENCE TO RELATED APPLICATION

The present application is a U.S. National Stage filing under 35 U.S.C. § 371 of International Application No. PCT/US2013/059335, filed on Sep. 12, 2013, entitled "CIRCUIT SWITCH PRE-RESERVATION IN AN ON-CHIP NETWORK." The International Application, including any appendices or attachments thereof, is hereby incorporated by reference in its entirety.

BACKGROUND

Unless otherwise indicated herein, the approaches described in this section are not prior art to the claims in this application and are not admitted to be prior art by inclusion in this section.

In keeping with Moore's Law, the number of transistors that can be practicably incorporated into an integrated circuit has doubled approximately every two years. This trend has continued for more than half a century and is expected to continue until at least 2015 or 2020. However, simply adding more transistors to a single-threaded processor no longer produces a significantly faster processor. Instead, increased system performance has been attained by integrating multiple processor cores on a single chip to create a chip multiprocessor, and sharing processes between the multiple processor cores of the chip multiprocessor. Such processors can greatly reduce processing time for applications that have high levels of concurrency, such as applications in which multiple computations can be executed simultaneously or in parallel with each other.

In practice, efficient use of all processor cores in high core-count chip multiprocessors is difficult, since threshold voltage can no longer be scaled down without exponentially increasing the static power consumption incurred due to leakage current in the chip multiprocessor. As a result, the power budget available per core in high core-count chip multiprocessors is projected to decrease in each future technology generation. This situation results in a phenomenon referred to as the "power wall," "utility wall," or "dark silicon," where an increasing fraction of a high core-count chip multiprocessor may not be powered at full frequency or powered on at all. Thus, performance improvements in such chip multiprocessors may be strongly contingent on energy efficiency of a multiprocessor.

SUMMARY

In accordance with at least some embodiments of the present disclosure, a network-on-chip comprises a destination router disposed at a destination node of the NoC. The destination router may be configured to receive a memory request from a network device disposed at the destination node, and transmit a connection setup message and the memory request to a source node of the NoC, the connection setup message being configured to pre-reserve for a circuit switching connection between the destination router and a router disposed at the source node.

In accordance with at least some embodiments of the present disclosure, a network-on-chip comprises a router disposed at a destination node of the NoC. The router may be configured to receive a connection setup message originating from a destination node of the NoC, the connection setup message including a reservation window that indicates a requested time frame for using the router in a circuit-switched connection. The router may be further configured to determine availability of the router for use in the circuit-switched connection during the requested time frame and, upon determining that the router is available during the requested time frame, transmit the connection setup message and an acknowledgement message.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The foregoing and other features of the present disclosure will become more fully apparent from the following description and appended claims, taken in conjunction with the accompanying drawings. These drawings depict only several embodiments in accordance with the disclosure and are, therefore, not to be considered limiting of its scope. The disclosure will be described with additional specificity and detail through use of the accompanying drawings.

DETAILED DESCRIPTION

Figure 1:
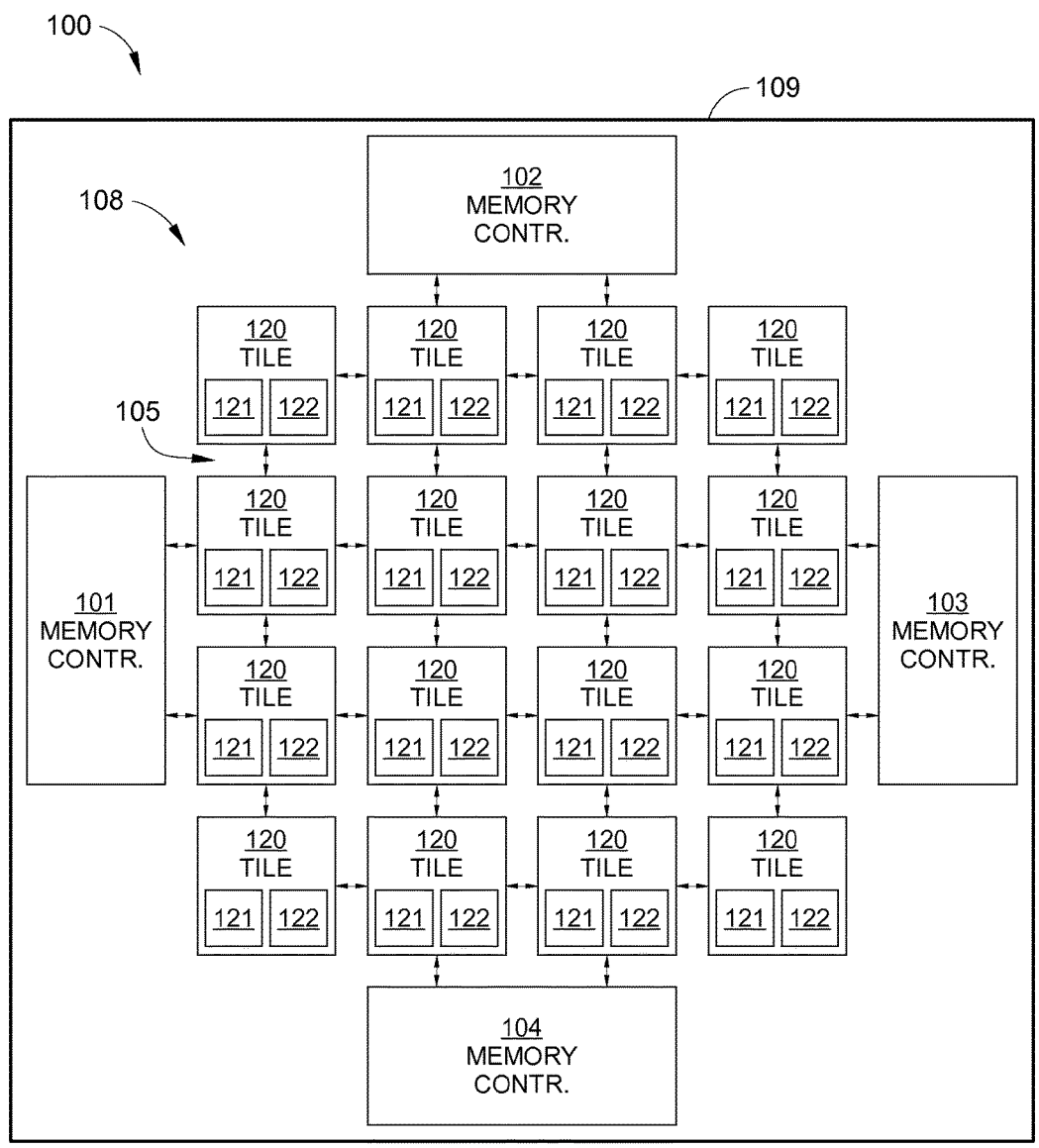
FIG. 1 is a block diagram of an example embodiment of a chip multiprocessor.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. The aspects of the disclosure, as generally described herein, and illustrated in the Figures, can be arranged, substituted, combined, and designed in a wide variety of different configurations, all of which are explicitly contemplated and made part of this disclosure.

This disclosure is generally drawn, inter alia, to methods, apparatus, systems, devices, and/or computer program products related to chip multiprocessors.

Briefly stated, a network-on-chip may include routers configured to pre-reserve circuit-switched connections between a source node and a destination node before requested data are available for transmission from the source node to the destination node. Because the circuit-switched connection is already established between the source node and the destination node when the requested data are available for transmission from the source node, the data can be transmitted without the delay caused by setup overhead of the circuit-switched connection. A connection setup message may be transmitted together with a memory request from the destination node to facilitate pre-reservation of the circuit-switched connection.

FIG. 1 is a block diagram of an example embodiment of a chip multiprocessor (CMP) 100, arranged in accordance with some embodiments of the present disclosure. CMP 100 may include a plurality of tiles 120, memory controllers 101-104, and a communication subsystem 105 disposed there between. Tiles 120, memory controllers 101-104, and communication subsystem 105 may be formed on a single die 109 and, together may be configured as a network-on-chip 108, or NoC. NoC 108 may be configured to apply networking theory and methods to provide on-chip communication in CMP 100. In some embodiments, CMP 100 may include additional components that are formed on a single integrated circuit die 109, such as analog devices, mixed-signal devices, radio-frequency devices, etc., but such additional components are omitted, in FIG. 1 for clarity.

Each of tiles 120 may form a node of NoC 108 and may include a processor core 121 with an associated cache hierarchy, such as L1, L2, and L3 cache, and a co-located network router 122. Each processor core 121 may be any technically feasible processor or processor core formed on integrated circuit die 109, such as a central processing unit (CPU), a graphics processing unit (GPU), an accelerator, a reprogrammable circuit, or a homogeneous or heterogeneous cluster/group of the previously-mentioned cores, etc. Each network router 122 may be any technically feasible on-chip router configured to support packet switching and circuit switching. One example embodiment of a network router 122 is described below in conjunction with FIG. 3. Communication subsystem 105 may include interconnects that couple tiles 120 with memory controllers 101-104 as shown. In the embodiment illustrated in FIG. 1, communication subsystem 105 may couple tiles 120 using a 2-dimensional mesh network topology. However, communication subsystem 105 may be configured with any other technically feasible network topology without exceeding the scope of the disclosure. In some embodiments, dimension-ordered routing may be used in NoC 108. In dimension-ordered routing, packets may be routed along the x-dimension before being routed along the y-dimension in a NoC for simplicity and deadlock freedom.

Memory controllers 101-104 may be configured to manage the flow of data going to and from on-chip or off-chip main memory resources associated with CMP 100, such as random access memory (RAM). RAM associated with CMP 100 may include off-chip memory resources and/or on-chip memory resources, such as a DRAM, SRAM, Magneto-resistive RAM (MRAM), and/or Phase-change RAM (PRAM), arranged in 2D or 3D. In some embodiments, physical memory addresses may be interleaved across memory controllers 101-104 in a page-interleaved manner. For example, a first page and a fifth page may map to memory controller 101, a second page and a sixth page may map to memory controller 102, a third page and a seventh page may map to memory controller 103, a fourth page and an eighth page may map to memory controller 104, and so on. Thus, each of memory controllers 101-104 may control a different portion of the main memory associated with CMP 100. To provide large physical memory space to each processor core 121, each processor core 121 may have access the memory controlled by any of memory controllers 101-104. As a result, processor cores 121 may contend with each other in accessing each of memory controllers 101-104. Therefore a switching policy may generally be used for routing data in NoC 108 to handle such contention.

Different switching technologies that can be used in routing a packet on NoC 108 include circuit switching and packet switching. In circuit switching, a connection between source and destination nodes of NoC 108 is fully established and reserved for data transfer between the source and destination nodes. In packet switching, commonly used in modern multi-core NoCs, each individual packet travels independently and reserves port and link resources incrementally as the packet travels through NoC 108. Although circuit switching generally incurs lower data transfer latency, high utilization of bandwidth may not be achieved due to underutilized connections or collisions among conflicting reservations. In contrast, with packet switching, each packet may go through four stages of processing at a router: decode and routing, virtual channel allocation, switch allocation, and switch traversal. These steps may be typically pipelined and incur a few clock cycles routing delay at each node through which a packet travels. Each stage of processing of a packet at a router consumes energy. Also, relatively deep buffers may be provided to retain data at the router until virtual channel and switch allocation are successfully completed for the data. Hence, in certain contexts, packet switching may not be energy efficient compared to circuit switching.

Performance improvements in chip multiprocessor design may be strongly contingent on energy efficiency of the design due to the phenomenon referred to as the "power wall." Furthermore, the routers of a chip multiprocessor NoC can be a major energy consumer in high core-count chip multiprocessors. Specifically, when the number of cores is increased in a chip multiprocessor at a ratio of x, the communication network of an associated NoC may grow at a ratio of $x^2$, since each of the x cores communicates with other cores of the chip multiprocessor. Hence, for higher core-count chip multiprocessors, the NoC can consume a large portion of the die area and power consumption of a chip multiprocessor. For example, in an Intel tiled 80-core prototype chip, the NoC may consume approximately 28% of chip power, which is greater than the power consumed by caches (approximately 21%), the clock distribution circuit (approximately 11%), and register files (approximately 4%). The relative energy inefficiency associated with packet switching in a NoC can greatly exacerbate this trend. Unfortunately, in circuit switching, connection setup overhead and low bandwidth utilization can also be problematic, and are described below in conjunction with FIG. 2.

Figure 2:
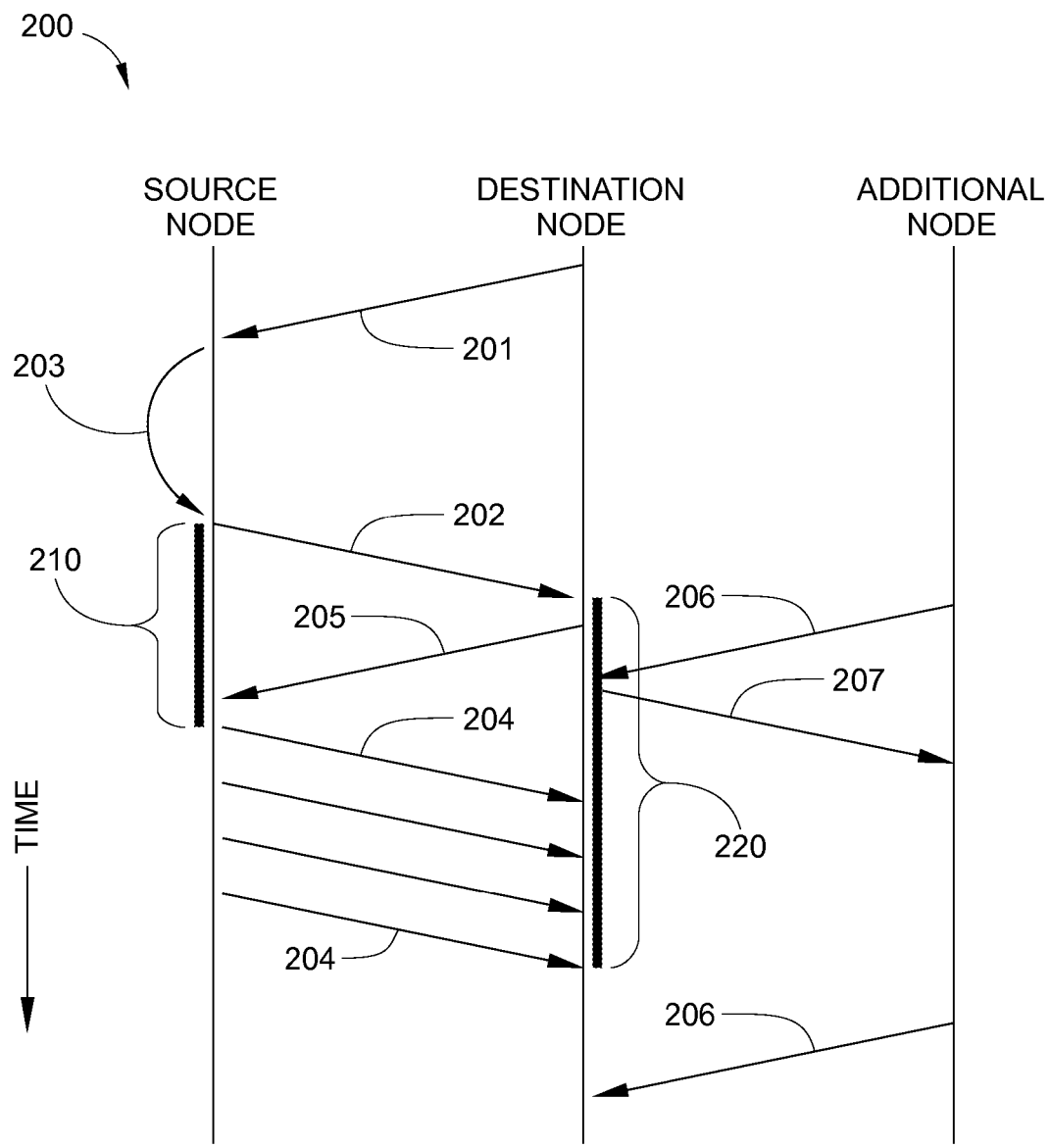
FIG. 2 is an example timing diagram illustrating the connection setup overhead and reduced bandwidth utilization associated with circuit switching implemented in a network-on-chip.

FIG. 2 is an example timing diagram 200 illustrating the connection setup overhead and reduced bandwidth utilization associated with circuit switching implemented in some NoCs. FIG. 2 shows activity related to three nodes in a tiled multicore architecture or NoC with respect to time, including a source node, a destination node, and an additional node. The destination node may be a node of the NoC in which a processor core requests data that is not currently present in the cache hierarchy of the processor core. The request may be for a single cache block or for multiple cache blocks. Such a request 201 may be generated, for example, in response to a cache miss experienced by the processor core or a prefetch executed by the processor core. The source node sends data over the NoC in response to the data request by the processor core located at the destination node. For example, the source node may be a node of the NoC coupled to one of the memory controllers of the NoC, and therefore can be used to fetch data from main memory via a memory fetch 203. Alternatively, the source node may be a node of the NoC coupled to one of the caches of another node where data is located. The additional node may be another node of the NoC that may make use of the router at the destination node during a portion of the time indicated in timing diagram 200. In FIG. 2, the source node and the destination node are adjacent to each other, but in practice may be indirectly connected and separated by one or more network hops.

In operation, the destination node sends data request 201 to the source node, which then fetches data from main memory via a memory fetch 203. After the source node receives the fetched data from main memory, the source node sends a circuit-switched connection setup packet 202 to the destination node so that circuit switching can be used to transmit the fetched data to the destination node. Once all routers along the connection path between the source node and the destination node are successfully reserved, the destination node returns an acknowledgement packet 205 to the source node. After receiving acknowledgement packet 205, the source node then sends the requested data to the destination node, via data transmissions 204. The last of data transmissions 204 may contain a command to tear down the circuit-switched connection between the source node and the destination node.

As shown, connection setup overhead 210 may occur between transmission of setup packet 202 and receipt of acknowledgement packet 205 by the source node, since data may not be sent until a circuit-switched connection is established between the source node and the destination node. This delay in the transmission of data transmissions 204 can incur latency costs while the destination node waits for data transmissions 204 to be delivered. Furthermore, this delay in the transmission of data transmissions 204 can incur energy costs associated with buffering fetched data at the source node. In addition, reduced bandwidth utilization can occur as a result of the extended reservation window 220 associated with the destination node, resulting in routers and links in the NoC that are part of the circuit-switched path between the source node and the destination node being underutilized. Specifically, bandwidth utilization may be reduced in the NoC because a circuit-switched connection is reserved at the destination node as soon as setup packet 202 is received by the destination node. Therefore, the destination node cannot be used for data transmission requested by the additional node or any other node in the NoC. Thus, when the destination node receives packet 206 from the additional node during reservation window 220, the destination node rejects packet 206 with a negative acknowledgement 207. Consequently, packet 206 is delayed and may be resent at a later time, thereby degrading the overall performance of the NoC.

According to embodiments of the disclosure, a NoC may be configured to implement circuit switching in a way that reduces the connection setup overhead and improves bandwidth utilization. Specifically, a NoC may include routers configured to pre-reserve circuit-switched connections between a source node and a destination node before requested data are available for transmission from the source node to the destination node. Thus, a circuit-switched connection is already established between the source node and the destination node before the requested data are available for transmission from the source node. Consequently, the data can be transmitted without the delay caused by setup overhead, such as connection setup overhead 210 in FIG. 2. Energy costs associated with buffering data at nodes in the circuit-switched connection may thus be reduced. One example embodiment of a network router configured to pre-reserve a circuit-switched connection between a source node and a destination node is described below in conjunction with FIG. 3

Figure 3:
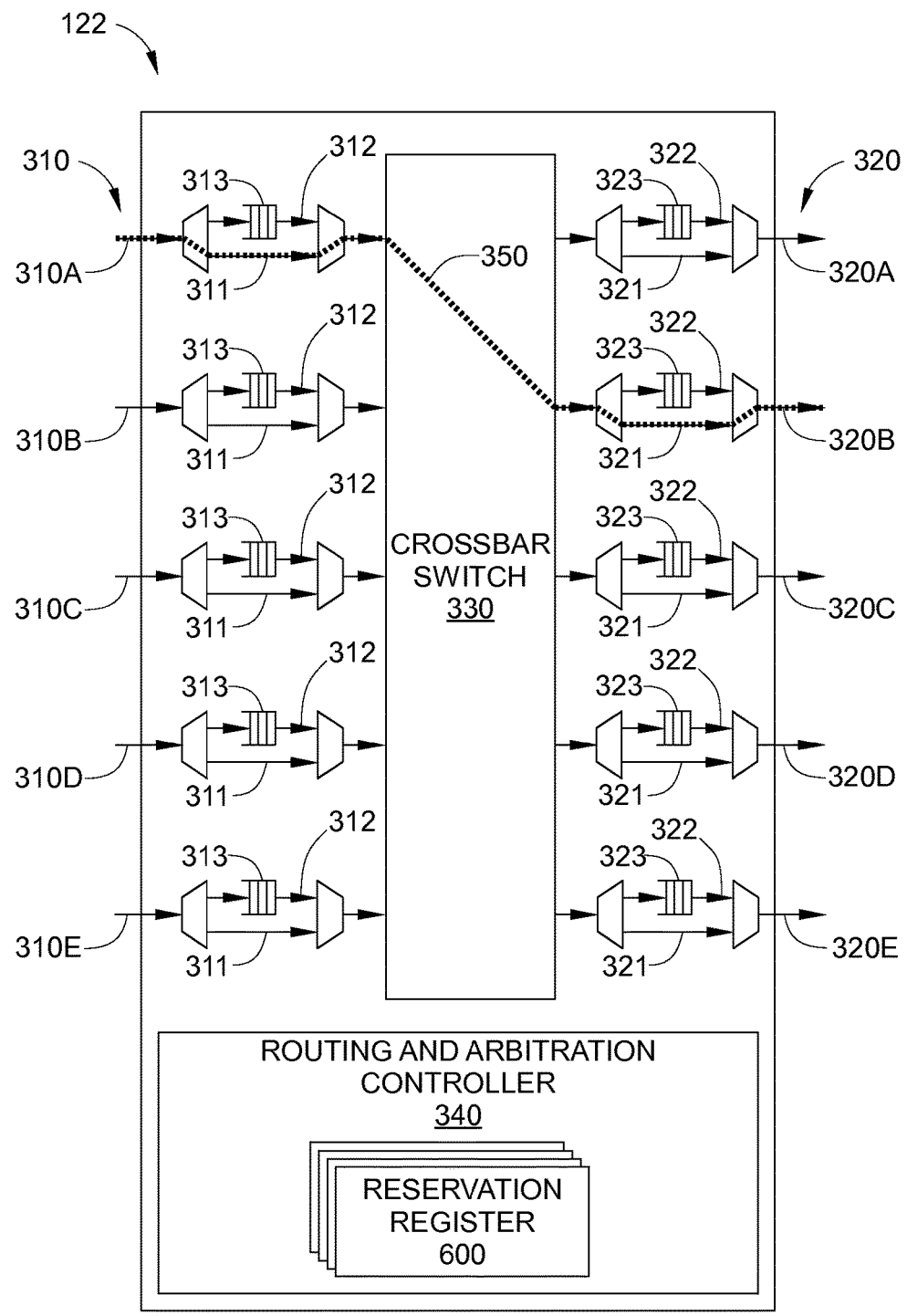
FIG. 3 is a schematic diagram of an example embodiment of a network router of the network-on-chip in FIG. 1.

FIG. 3 is a schematic diagram of an example embodiment of a network router 122 in NoC 108 of FIG. 1. Network router 122 may include five input ports 310, five output ports 320, a crossbar switch 330, and a routing and arbitration controller 340. Network router 122 can include more or fewer input ports 310 or output ports 320 than shown in FIG. 3 depending on the topology of NoC 108 and the location of the router in NoC 108. For example, in the embodiment illustrated in FIG. 3, when network router 122 is part of a 2-D topology, network router 122 includes input ports 310A-D, for north, south, east, and west input ports and input port 310E for a self/local input port. In another example, when network router 122 is associated with a tile 120 disposed at a corner node of NoC 108, network router 122 may only include three input ports 310 and three output ports 320, since that particular network router 122 is adjacent to exactly two other nodes and also may include a self/local input port. In the embodiment illustrated in FIG. 3, network router 122 may be configured as a hybrid router that can implement packet switching as well as circuit switching. However, in other embodiments, network router 122 may be configured to implement circuit switching but not packet switching.

Each of input ports 310 may be associated with a circuit-switched virtual channel 311 and a packet-switched virtual channel 312. Each packet-switched virtual channel 312 may include a buffer 313 for storing one or more units of communication, e.g., transferred data, until the next portion of NoC 108 is available for data transmission. Each of output ports 320 may be associated with a circuit-switched virtual channel 321 and a packet-switched virtual channel 322. In other embodiments, network router 122 may be configured with different numbers of circuit-switched virtual channels and packet-switched virtual channels. Each packet-switched virtual channel 322 may include a buffer 323 for storing one or more units of communication until the next portion of NoC 108 is available for data transmission. Thus, in the embodiment illustrated in FIG. 3, network router 122 may be configured with input and output buffering. However, in other embodiments, network router 122 may be configured with input buffering (buffers 313) and no output buffering (buffers 323), or vice-versa. Crossbar switch 330 may interconnect input ports 310 with output ports 320. Routing and arbitration controller 340 may implement a routing algorithm and packet flow control protocol for network router 122, and may set the crossbar switch 330 accordingly. For example, routing and arbitration controller 340 can be configured to resolve conflicts between simultaneous requests for the same output port 320. In some embodiments, routing and arbitration controller 340 may include one reservation register 600 for each output port 320 of network router 122. An example embodiment of a reservation register 600 is described below in conjunction with FIG. 6.

By way of illustration, network router 122 is depicted in FIG. 3 with a circuit-switched channel 350 that couples input port 310A with output port 320B. As shown, when circuit-switched channel 350 is established in this way, buffers 313 may be stalled when full since circuit-switched channel 350 does not include one of packet-switched virtual channels 312, and buffers 323 may not be used since circuit-switched channel 350 does not include one of packet-switched virtual channels 322. Consequently, the energy cost associated with buffers 313 and/or buffers 323 can be avoided. Additionally, when circuit-switched channel 350 is used, no decode and routing operation is necessarily performed by routing and arbitration controller 340, which may also save energy cost. Furthermore, by eliminating decode and routing, virtual channel allocation, and switch allocation, routing delay may be reduced.

To minimize or otherwise reduce the connection setup overhead and low bandwidth utilization typically associated with circuit switching in a NoC, routing and arbitration controller 340 may be configured to perform one or more functions, acts, or operations that enable a circuit-switched connection to be pre-reserved between a source node and a destination node in NoC 108. These functions, acts, or operations may be are different, depending on whether routing and arbitration controller 340 is in a network router 122 that is currently acting as a source node in NoC 108, a destination node in NoC 108, or an intermediary node located along a circuit-switched path between a destination node and a source node of NoC 108.

Specifically, when network router 122 is disposed at a destination node of NoC 108, routing and arbitration controller 340 may be configured to receive a memory request from a network device disposed at the destination node (e.g., processor core 121), set up ports corresponding to the circuit switch connection for the return path of the reply message, and transmit a connection setup message along with the memory request to a source node of NoC 108. The connection setup message may be configured to include commands for each network router between the source node and the destination node to pre-reserve a circuit-switched connection at each of the nodes between and including the destination node and the source node of NoC 108. Network routers 122 may implement these commands, for example, via routing and arbitration controller 340, to pre-reserve a circuit-switched connection with the appropriate ports in the opposite direction of the request message. The particular source node that is subject to the memory request may be dependent on the physical memory address(es) associated with the memory request.

When network router 122 is disposed at an intermediary node of NoC 108 located along a circuit-switched path between the destination node and the source node, routing and arbitration controller 340 may be configured to receive a connection setup message originating from the destination node of NoC 108. The connection setup message may include a pre-reservation window that indicates a requested period of time during which network router 122 is reserved in a circuit-switched connection between the destination node and the source node. Routing and arbitration controller 340 may also be configured, upon receiving the connection setup message, to determine availability of network router 122 for use in the circuit-switched connection during the requested period of time. Upon determining that network router 122 is available during the requested period of time, routing and arbitration controller 340 may be configured to pre-reserve the circuit switch connection with appropriate ports corresponding to the opposite direction of the connection setup message, transmit the connection setup message and also an acknowledgement message to the next node in the intended circuit-switched connection between the destination node and the source node.

When network router 122 is disposed at the source node of NoC 108, routing and arbitration controller 340 may be configured to receive a memory request and a connection setup message originating from the destination node of NoC 108. In addition, routing and arbitration controller 340 may be configured to receive acknowledgement messages from each node that makes up the desired circuit-switched connection between the destination node and the source node. Routing and arbitration controller 340 may also be configured to determine, based on the acknowledgement messages, whether all routers and links that form the circuit-switched connection are successfully pre-reserved. Routing and arbitration controller 340 may be further configured, when the circuit-switched connection is successfully pre-reserved in NoC 108, to initiate a memory fetch based on the memory request and to transmit the fetched data to the destination node of NoC 122 via the pre-reserved circuit-switched connection.

Figure 4:
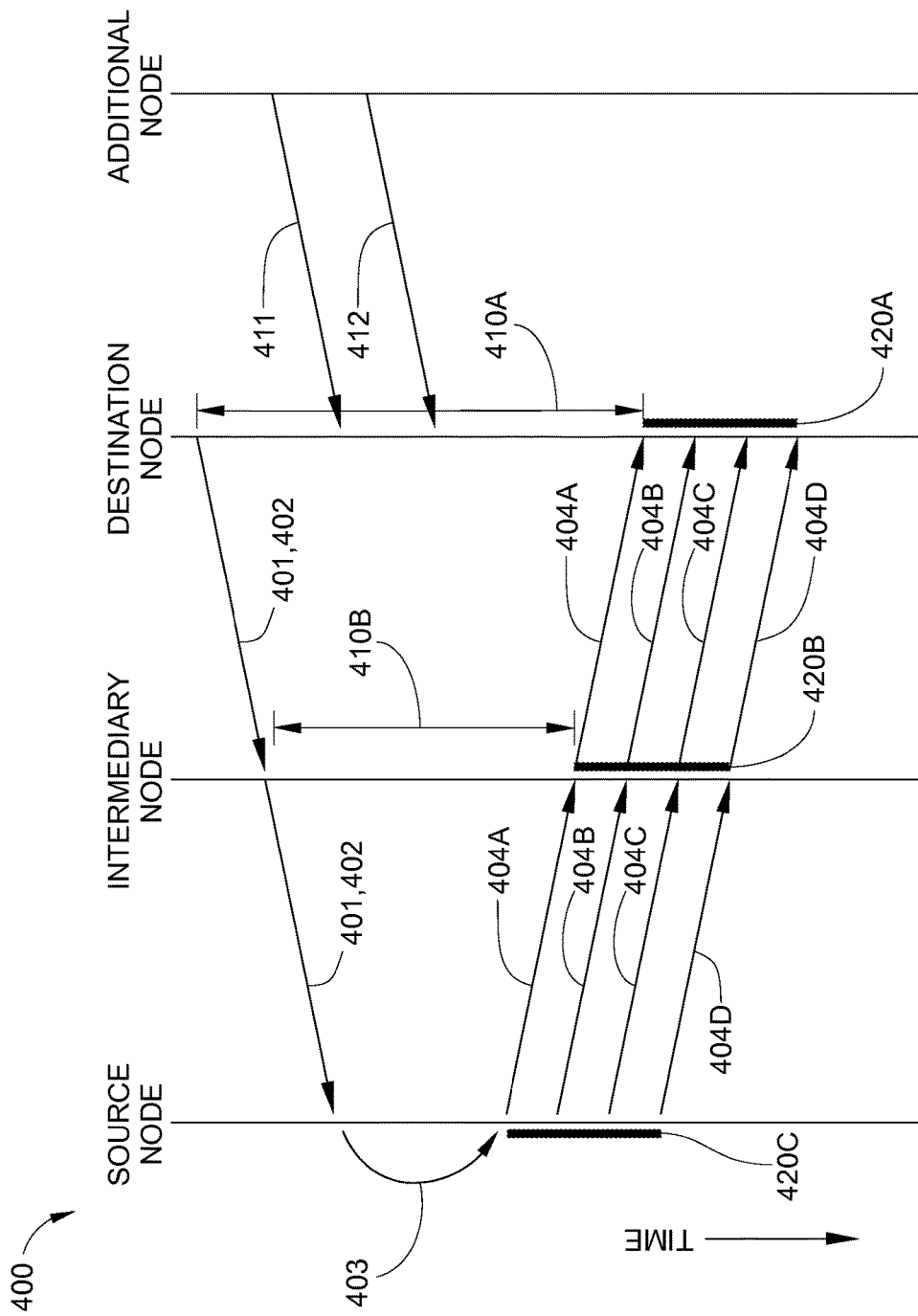
FIG. 4 is an example timing diagram illustrating an example embodiment of a pre-reservation scheme in a network-on-chip.

FIG. 4 is an example timing diagram 400 illustrating an example embodiment of a pre-reservation scheme in a NoC, in accordance with some embodiments of the present disclosure. FIG. 4 shows activity with respect to time related to a source node, a destination node, an intermediary node, and an additional node in a tiled multicore architecture or NoC, such as NoC 108 in FIG. 1. The intermediary node may be a node of NoC 108 that is disposed between the source node and destination node and is part of a pre-reserved circuit-switched connection formed between the source node and the destination node via an embodiment of the pre-reservation scheme. The additional node may not be located between the source node and the destination node, and is not part of the pre-reserved circuit-switching connection formed between the source node and the destination node. However, in some embodiments, the additional node may be any of the nodes making up NoC 108. In FIG. 4, the source node and the destination node may be directly connected by the intermediary node and no other nodes of NoC 108, but in practice the source node and the destination node may be adjacent to each other or separated by multiple intermediary nodes of NoC 108, depending on the size of NoC 108 and the routing of the pre-reserved circuit-switched connection.

In operation, the destination node may send a memory request 401 and a connection setup message 402 to the source node via the intermediary node. In some embodiments, memory request 401 and connection setup message 402 may be sent as a combined message from the destination node to the source node. In other words, connection setup message 402 may be "piggy-backed" onto memory request 401.

Memory request 401 may be generated in response to a cache miss experienced by a network device located at the destination node, e.g., a processor core. Alternatively, memory request 401 may be generated in response to a prefetch request executed by the network device located at the destination node. Generally, memory request may include one or more physical memory addresses that correspond to a particular portion of main memory that is accessed by one of memory controllers 101-104 in FIG. 1.

Connection setup message 402 may include commands for each network router 122 between the source node and the destination node to pre-reserve a circuit-switched connection at each of the nodes between and including the network router 122 disposed at the destination node and the network router 122 disposed at the source node of NoC 108. Connection setup message 402 may include a pre-reservation window for each network router 122 making up the circuit-switched connection to be used between the destination node and the source node. Thus, for the embodiment illustrated in FIG. 4, connection setup message 402 may include commands that request the reservation of a pre-reservation window 420A for the destination node, the reservation of a pre-reservation window 420B for the intermediary node, and the reservation of a pre-reservation window 420C for the source node. Alternatively, the pre-reservation window for the destination node (pre-reservation window 420A) may be established without the use of connection setup message 402. As shown, pre-reservation window 420A and pre-reservation window 420B may overlap in time, but may not coincide exactly in time since the intermediary node handles data before the destination node. In other words, pre-reservation window 420B may begin in time prior to the start of pre-reservation window 420A and may end prior to the end of pre-reservation window 420A.

In some embodiments, connection setup message 402 may also include acknowledgement or negative acknowledgement messages associated with each node of NoC 108 that are pre-reserved for use in the desired circuit-switched connection. Thus, for the embodiment illustrated in FIG. 4, connection setup message 402 may include acknowledgement or negative acknowledgement messages generated by the destination node and by the intermediary node. In this way, connection setup message 402 may indicate to the source node the status of each node in the pre-reserved circuit-switched connection prior to the source node transmitting data to the destination node. In some embodiments, the above-described acknowledgement or negative acknowledgement messages for each node may be appended to connection setup message 402. In other embodiments, the above-described acknowledgement or negative acknowledgement messages may be reflected in connection setup message 402 as an updated value or status. Furthermore, any other technically feasible implementations of tracking the pre-reserved status of nodes in a circuit-switched connection being established in response to memory request 401 may be included in connection setup message 402 without exceeding the scope of the disclosure.

After the network router 122 at the destination node provides either an acknowledgement or a negative acknowledgement message indicating whether or not the destination node is available during pre-reservation window 420A, the network router 122 at the destination node may transmit memory request 401 and connection setup message 402 to the intermediary node. The intermediary node may then receive memory request 401 and connection setup message 402. In response to connection setup message 402, the network router 122 of the intermediary node may determine availability of the intermediary node for use in the desired circuit-switched connection, append an acknowledgement or negative acknowledgement message to connection setup message 402, and transmit memory request 401 and connection setup message 402 to the source node. If any of the intermediary nodes receives a negative acknowledgement message, it may conclude that the circuit switch connection may not be established. In response to the conclusion, it may ignore the pre-reservation window altogether, hence not pre-reserving router resources for the circuit switch connection.

As shown in FIG. 4, the source node may then receive memory request 401 and connection setup message 402. The source node may perform a memory fetch 403 in accordance with the received memory request 401. Although depicted in FIG. 4 to include a finite delay, memory fetch 403 may have a small delay when memory request 401 is for memory addresses cached at source node. When a circuit-switched connection between the source node and the destination node is successfully pre-reserved by connection setup message 402 (as indicated by acknowledgement messages), the source node may send results of memory fetch 403 to the destination node via the intermediary node in one or more data transmissions 404A-404D. Data transmissions 404A-404D may be received by the intermediary node during pre-reservation window 420B, and may be received by the destination node during pre-reservation window 420A. In some embodiments, a circuit-switched connection may not be established between the source node and the destination node, for example, due to a negative acknowledgement message included in connection setup message 402. In these embodiments, memory request 401 may be handled by the source node using packet switching. Packet switching may use a different path according to the routing policy, compared to the path under circuit-switched connection.

In some embodiments, the last data transmission from the source node, e.g., data transmission 404D, may contain a command to tear down the circuit-switched connection. In such embodiments, the circuit-switched connection between the source node and the destination node may be canceled once the tear-down command is executed, for example by routing and arbitration controller 340.

It is noted that during the time that memory request 401 and connection setup message 402 are being transmitted from the destination node to the source node, and also while the source node is performing memory fetch 403, nodes of NoC 108 that are pre-reserved for use in the desired circuit-switched connection may still be available for use in other connections, such as circuit-switched connections. For instance, in the embodiment illustrated in FIG. 4, the intermediary node may be available for use in other connections during time period 410B. The destination node may be available for use by other connections during time period 410A. Thus, the destination node can receive packets 411 and 412 from the additional node without or with otherwise reduced delay.

The duration of pre-reservation window 420B may be selected to reserve the intermediary node for no more than the time required for the receipt of data transmissions 404A-404D from the source node and transmission of data transmissions 404A-404D to the destination node. Similarly, the duration of pre-reservation window 420A may be sized to reserve the destination node for no more than the time to be used for the receipt of data transmissions 404A-404D from the intermediary node. In this way, bandwidth utilization can be maximized or otherwise improved in NoC 108. In practice, the minimum duration of pre-reservation window 420A and/or pre-reservation windows 420B may not be predictable to a high degree of precision. For example, the duration of time to perform memory fetch 403 may be variable. In some examples, memory fetch 403 may be performed in a short duration of time when the memory request encounters a hit in a row buffer of the memory, and in a longer duration of time when the memory request encounters a miss in the row buffer of the memory. In other examples, memory request 401 may encounter a delay in reaching the source node due to contention in the NoC 108. According to some embodiments, the duration of pre-reservation window 420A and/or pre-reservation windows 420B may be selected to include a safety margin to allow a circuit-switched connection between the source node and the destination node to function properly even in the presence of variability in the duration of time used to perform memory fetch 403, or delays in the transmission of memory request 401 from the source node to the destination node, or due to other reasons. One such embodiment is described below in conjunction with FIG. 5.

Figure 5:
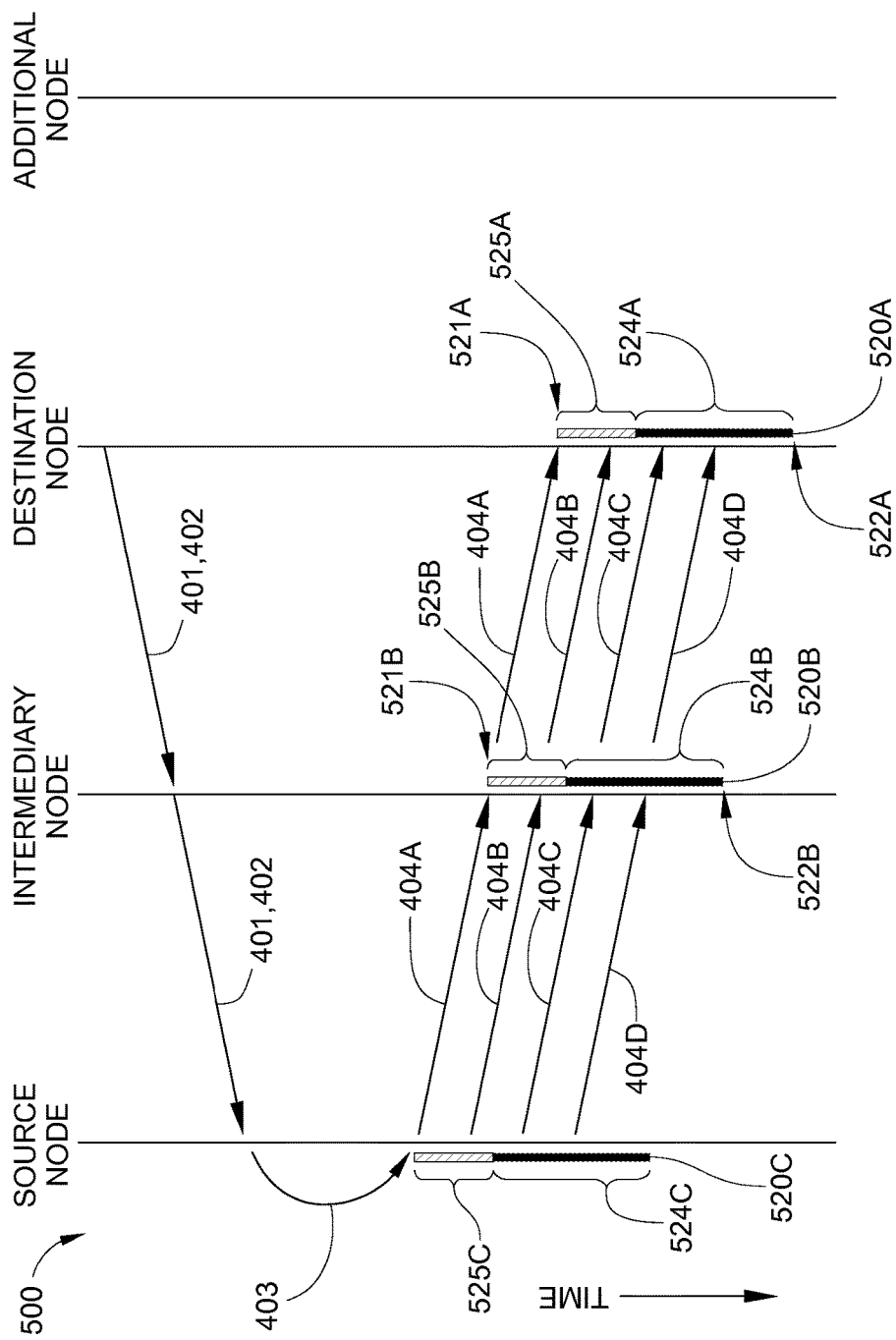
FIG. 5 is an example timing diagram illustrating an example embodiment of a pre-reservation scheme that includes a safety margin.

FIG. 5 is an example timing diagram 500 illustrating an example embodiment of a pre-reservation scheme that includes a safety margin in the pre-reservation window at each node, in accordance with some embodiments of the present disclosure. Timing diagram 500 may be substantially similar to timing diagram 400, except that the pre-reservation window associated with the intermediary node (a pre-reservation window 520B) may include a minimum transmission time 524B and a safety margin 525B, the pre-reservation window associated with the destination node (a pre-reservation window 520A) may include a minimum transmission time 524A and a safety margin 525A, and the pre-reservation window associated with the source node (a pre-reservation window 520C) may include a minimum transmission time 524C and a safety margin 525C.

In some embodiments, a start time 521B, an end time 522B, and the duration of safety margin 525B of pre-reservation window 520B may be determined by network router 122 of the destination node. In some embodiments, routing and arbitration controller 340 of the network router 122 at the destination node may make such determinations, while in other embodiments any other device or software construct associated with the network router 122 may make such determinations. The intermediary nodes introduce appropriate offsets accounting for the 1-hop delay between network routers 122. Start time 521B, end time 522B, and the duration of safety margin 525B may be determined based at least in part on various factors, including: a minimum (or otherwise reduced) possible time and an average time for memory request 401 and connection setup message 402 to reach the source node from the destination node, a minimum (or otherwise reduced) possible time and an average time for memory fetch 403 to be completed by the source node, and message propagation delay from the source node to the node that is pre-reserving the connection window. In a similar manner, the network router of the destination node may determine a start time 521A, an end time 522A, and the duration of safety margin 525A of pre-reservation window 520A. For brevity, only the determination of start time 521B, end time 522B, and the duration of safety margin 525B for the intermediary node are described herein. The start time 521A, end time 522A, and the duration of safety margin 525A for the destination node can be readily determined based on the subject matter disclosed herein.

In some embodiments, start time 521B may be selected based on deterministic values, including a minimum (or otherwise reduced) possible time for memory request 401 and connection setup message 402 to reach the source node from the destination node, a minimum (or otherwise reduced) possible time for memory fetch 403 to be completed by the source node, and a time for the fetched data to be transmitted via the source node to the intermediary node.

The minimum (or otherwise reduced) possible time for memory request 401 and connection setup message 402 to reach the source node from the destination node may generally assume that no contention occurs when memory request 401 and connection setup message 402 are transmitted to the source node via packet switching. The minimum (or otherwise reduced) possible time for memory fetch 403 to be completed by the source node may generally assume that the physical addresses included in memory request 401 hit in the row buffer of the main memory and that other memory requests are not favored over memory request 401. The time for the fetched data to be transmitted from the source node to the intermediary node can be calculated based on the number of network hops between the source node and the intermediary node.

In some embodiments, the determination of start time 521B may be further based on the inclusion of estimated delays that are likely to occur in connection setup message 402 reaching the source node from the destination node and in the completion of memory fetch 403. In such embodiments, start time 521B may be selected to be later than the earliest possible time that data transmission 404B can reach the intermediary node, since such a scenario may be relatively unlikely in a particular NoC. For example, start time 521B may be determined by assuming that transmission delays occur with an average contention rate as connection setup message 402 travels to the source node from the destination node. Alternatively or additionally, start time 521B may be determined by assuming that an average time elapses for the source node to complete memory fetch 403. In this way, bandwidth utilization in NoC 108 may be enhanced, since start time 521B of pre-reservation window 520B may not start significantly earlier than data transmission 404A is likely to arrive at the intermediary node. Furthermore, in the relatively rare instances in which data transmission 404A does arrive at the intermediary node earlier than start time 521B, the delay associated therewith may be relatively short and therefore may have little impact on the bandwidth utilization of NoC 108.

End time 522B, and consequently the duration of safety margin 525B, may be determined based on various estimated factors, including uncertainty in the transmission of connection setup message 402 to the source node from the destination node and uncertainty in the time for memory fetch 403 to be completed by the source node. Factors affecting these uncertainties may include the size and architecture of NoC 108, the physical size of communication subsystem 105, the type of physical memory used, the speed of memory controllers 101-104, and the like.

When sending data transmission 404A from the source node to the intermediary node results in the arrival of data transmission 404A prior to start time 521B at the intermediary node, transmission from the source node is delayed. Thus, even though data transmission 404A may be available at the source node, in some embodiments and under certain circumstances, there may be some delay in sending data transmission 404A to the intermediary node. Conversely, in some embodiments, when transmission of data transmission 404A from the source node can cause arrival of data at the intermediary node after safety margin 525B expires, data transmission 404A may not be transmitted to the intermediary node. Instead, the circuit-switched connection between the source node and the destination node may be canceled, and memory request 401 may be satisfied using other mechanisms, for example, using a packet switched connection over NoC 108. By canceling the circuit-switched connection when the connection is determined to be no longer viable, nodes that are pre-reserved for the canceled connection may be made available for other operations as soon as reasonably possible. In this way, bandwidth utilization of NoC 108 may be maximized or otherwise increased.

In some embodiments, the circuit-switched connection between the source node and the destination node may be canceled automatically on a node-by-node basis. In other words, at any particular node, the circuit-switched connection between the source node and the destination node can be canceled when no data transmission is received by the node in question prior to the endpoint of the safety margin associated with that node. For example, when pre-reservation window 520B is established for the intermediary node and data transmission 404A is not received by the intermediary node prior to the expiration of safety margin 525B, the circuit-switched connection between the source node and the destination node can be immediately canceled. Thus, pre-reservation window 520B is canceled and the intermediary node can be considered available for use in other circuit-switched or packet switching connections in NoC 108. Then, as each subsequent node in the circuit-switched connection fails to timely receive data transmission 404A (e.g., before an endpoint of the safety margin associated with the pre-reservation window of the node), the pre-reservation window of that node may be canceled so that the node becomes available for use in NoC 108.

As noted previously, the duration of safety margin 525A and 525B can be selected to take into account numerous factors specific to a particular NoC, including NoC architecture, chip size, physical memory latency and type, etc. In general, however, a longer safety margin can be incorporated into pre-reservation windows when the gap in performance and energy efficiency between circuit switching and packet switching is larger. This is because more risk can be taken regarding network bandwidth to attain greater reward. In other words, unutilized nodes that may be allowed to remain idle while waiting for a longer safety margin to expire in order to take advantage of the lower latency and energy costs that occur when a circuit-switched connection is successfully established. The gap in performance and energy efficiency between circuit switching and packet switching may increase in the following situations: quantities of data to be transmitted are relatively large, e.g., involving multiple blocks; overall NoC traffic is relatively low, so that the risk of clogging NoC bandwidth with safety margins is low; and data are to be transmitted over a large number of network hops.

In some embodiments, a pre-reservation window for a network router may be reserved locally and tracked by the network router itself. In such embodiments, each network router 122 in NoC 108 may track pre-reservation of the network router 122 for a specific period of time into the future, rather than for an arbitrarily long time into the future. In some embodiments, the specific time period may be based at least in part on the longest round-trip communication time that can occur in NoC 108 between a node of NoC 108 and a memory controller of CMP 100. In other words, the specific time period for which pre-reservation is tracked for network routers 122 of NoC 108 may be based on the round-trip communication time between a node of NoC 108 and a memory controller of CMP 100 that are separated by the largest number of network hops.

For example, if the maximum distance in NoC 108 between a node and a memory controller in NoC 108 is N network hops, the time to route a packet per network hop is T0 cycles, memory access time is T1, and data transmission time is T2, the maximum time a node of NoC 108 tracks pre-reserved windows for that node may be equal to (2*N*T0)+T1+T2. By way of illustration, in a typical 4×4 tiled multicore processor, N=6, T0=5 clock cycles, T1=200 clock cycles, and T2=32 clock cycles, for example, resulting in a round-trip communication time of about 292 clock cycles. In some embodiments, this time period can be tracked for each network node with a reservation register associated with the network router 122 of the network node, where the register includes a bit for each clock cycle that is tracked. For the above example, 292 clock cycles may be tracked by such a reservation register, consequently, the register includes 292 bits. An embodiment of one such reservation register is described below in conjunction with FIG. 6. In some embodiments, the time period tracked by such registration registers may be the same for all nodes of NoC 108, and in other embodiments, the time period tracked by such reservation registers may vary as a function of location in NoC 108 of each node.

Figure 6:
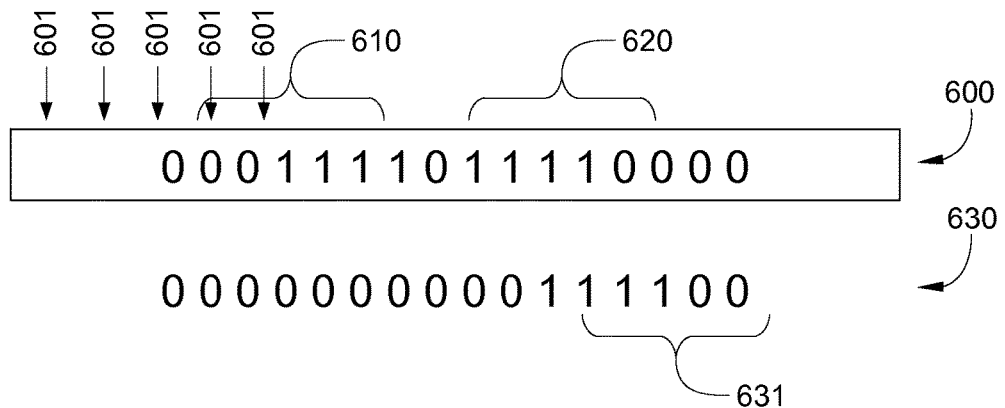
FIG. 6 schematically illustrates a reservation register for a network router.

FIG. 6 schematically illustrates a reservation register 600 for a network router, in accordance with some embodiments of the present disclosure. Reservation register 600 may include a plurality of bits 601, each of which corresponds to a future time period in which a network router associated with reservation register 600 can be pre-reserved. In some embodiments, each bit 601 may correspond to a unit of time as short as a single clock cycle of NoC 108, whereas in other embodiments, each bit 601 may correspond to multiple clock cycles. In the latter case, the memory used to track pre-reserved windows for a node can be reduced. For example, when reservation times for a node are tracked at a granularity of more than a single clock cycle, e.g., two, four, or eight clock cycles, the number of bits 601 in reservation register 600 may be reduced correspondingly. In the above example 4×4 tiled multicore processor, if each unit of time represented by a bit in reservation register 600 is two cycles, then the total number of bits 601 in registration register 600 may be at least 292/2=146 (i.e., 20 bytes) to track the largest data transmission time of interest. For clarity, reservation register 600 is depicted in FIG. 6 with 16 bits 601.

Each bit 601 in reservation register 600 may be given a value of "1" or "0." A value of "1" in a particular bit 601 may indicate that the associated network router 122 is reserved for use in a circuit-switched connection during the future time period corresponding to the bit. Conversely, a value of "0" in a particular bit 601 may indicate that the associated network router 122 is available during the future time period corresponding to the bit. As shown in FIG. 6, two pre-reservation windows 610 and 620 are indicated in reservation register 600, each with a duration of four time periods. Thus, when each bit in reservation register 600 represents two clock cycles, then pre-reservation windows 610 and 620 may each have a duration of eight clock cycles.

In general, a node or network router 122 of NoC 108 may include one reservation register 600 for each resource that can be pre-reserved for circuit-switched connections. Thus, for a 2D mesh, each network router 122 may have five output ports, and hence may include five reservation registers 600. Due to the memory-efficient manner in which reservation register 600 tracks pre-reserved windows for a node of NoC 108, maintenance of five reservation register 600 for each network router 122 of NoC 108 may have a relatively little small memory and energy cost. In the above example 4×4 tiled multicore processor, if time slot granularity is two cycles, then each reservation register 600 may include 146 bits (i.e., 20 bytes), so five total reservation registers 600 use 100 bytes. Consequently, implementation of five reservation registers 600 for a network router 122 in NoC 108 may incur relatively very small hardware and energy overhead in NoC 108.

In operation, the bit values of reservation register 600 may be shifted left at each time slot granularity represented by one of bits 601, thereby efficiently tracking future resource availability of the network router 122 that includes reservation register 600. Reservation register 600 may be used to check resource availability against a new pre-reservation request, such as a pre-reservation request contained in connection setup message 402 in FIG. 4. When the network router 122 that includes reservation register 600 receives a pre-reservation request 630, a time period 631 corresponding to the pre-reservation request may be compared to reservation register 600 to determine availability of the network router 122. Because time period 631 overlaps with one or more bits of either pre-reservation window 610 or 620, the pre-reservation request may be rejected by the network router 122. In some embodiments, such a comparison can be made by performing a bitwise AND operation between registration register 600 and pre-reservation request 630. In such embodiments, when the result is not equal to zero, an overlap exists therebetween, and the pre-reservation request may be rejected. Alternatively, other logical functions may be used to determine overlap between registration request 630 and registration register 600.

Figure 7:
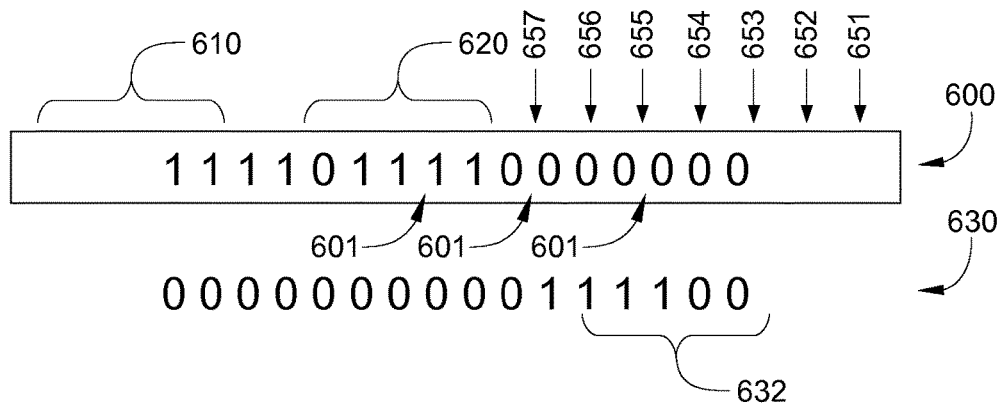
FIG. 7 schematically illustrates the reservation register of FIG. 6 after three time periods have transpired, each time period being equal to the length of time represented by a bit in the reservation register.

FIG. 7 schematically illustrates reservation register 600 after three time periods have transpired, each time period being equal to the length of time represented by a bit 601. Thus, when each bit 601 represents a time period of two clock cycles, FIG. 7 illustrates reservation register 600 six clock cycles later than the illustration of reservation register 600 in FIG. 6. Because three time periods have transpired, the "1" values corresponding to pre-reservation windows 610 or 620 may be shifted three bits to the left in reservation register 600. Thus, when the network router 122 that includes reservation register 600 again receives pre-reservation request 630 (or any other pre-registration request) that occurs in the first seven time periods 651-657 of reservation register 600, the network router 122 can accept pre-reservation request 630. As shown in FIG. 7, pre-reservation request 630 now corresponds to a time period 632 that occurs in time periods 651-657 and does not overlap with either of pre-reservation windows 610 or 620. Consequently, in this instance, the network router 122 that includes reservation register 600 may accept pre-reservation request 630 and may update bits 601 accordingly.

Figure 8:
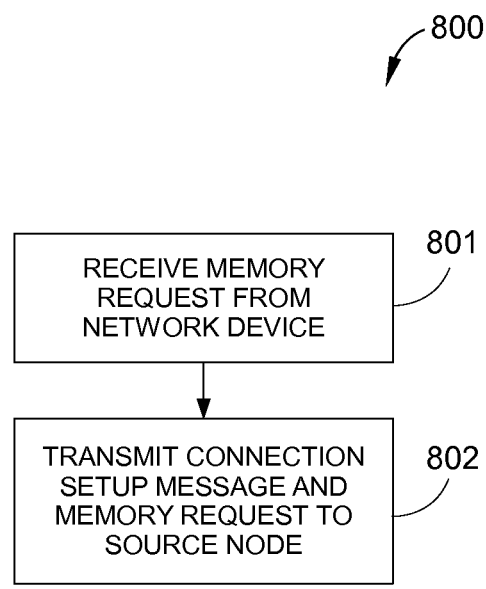
FIG. 8 sets forth a flowchart summarizing an example method 800 of transmitting data in a NoC.

FIG. 8 sets forth a flowchart summarizing an example method 800 of transmitting data in a NoC, according to an embodiment of the disclosure. Method 800 may include one or more operations, functions or actions as illustrated by one or more of blocks 801, and/or 802. Although the blocks are illustrated in a sequential order, these blocks may also be performed in parallel, and/or in a different order than those described herein. Also, the various blocks may be combined into fewer blocks, divided into additional blocks, and/or eliminated based upon the desired implementation. Additional blocks representing other operations, functions or actions may also be provided. Although method 800 is described in conjunction with CMP 100 of FIG. 1, any CMP suitably configured to perform method 800 is within the scope of this disclosure.

Method 800 may begin in block 801 "receive memory request from network device." Block 801 may be followed by block 802 "transmit connection setup message and memory request to source node."

In block 801, a network router, such as network router 122 in FIG. 1, receives a memory request from a network device of a NoC on CMP 100. For example, the network device may be a processor core located at a tile of the NoC.

In block 802, the network router transmits a connection setup message and the memory request received in block 801 to a source node in the NoC. The connection setup message may include commands to pre-reserve a destination router and the source router for a circuit-switched connection from the source router to the destination router.

Figure 9:
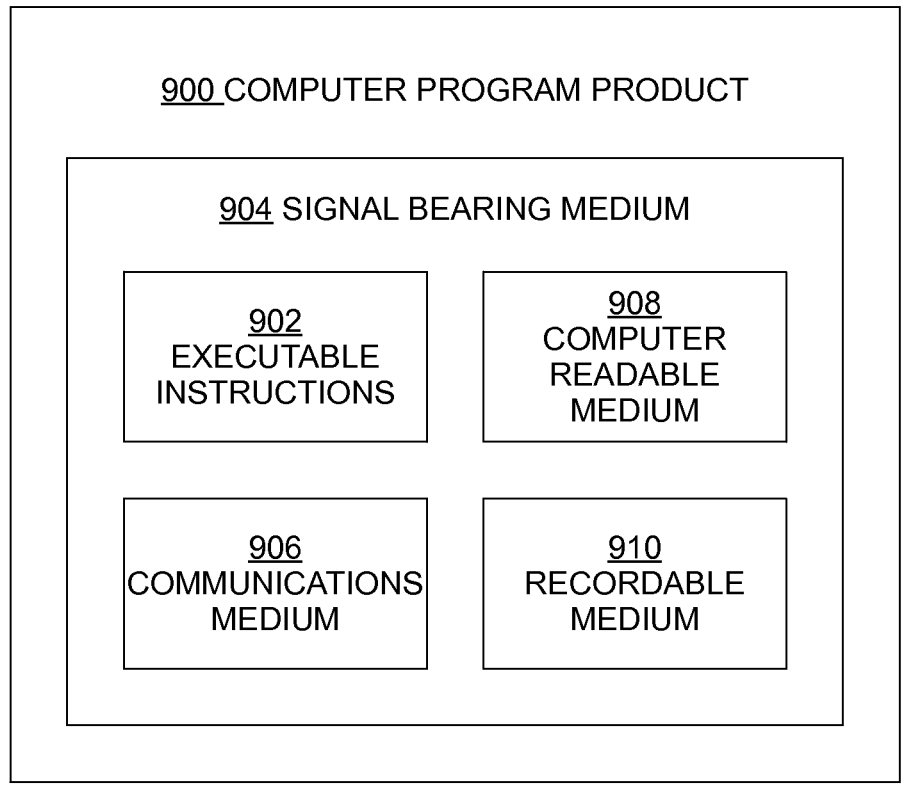
FIG. 9 is a block diagram of an illustrative embodiment of a computer program product to implement a method for pre-reserving a circuit-switched connection between a source node and a destination node before requested data are available for transmission from the source node to the destination node.

FIG. 9 is a block diagram of an illustrative embodiment of a computer program product 900 to implement a method for pre-reserving circuit-switched connections between a source node and a destination node before requested data are available for transmission from the source node to the destination node. Computer program product 900 may include a signal bearing medium 904. Signal bearing medium 904 may include one or more sets of executable instructions 902 that, when executed by, for example, a processor of a computing device, may provide at least the functionality described above with respect to FIGS. 1-8.

In some implementations, signal bearing medium 904 may encompass a non-transitory computer readable medium 908, such as, but not limited to, a hard disk drive, a Compact Disc (CD), a Digital Video Disk (DVD), a digital tape, memory, etc. In some implementations, signal bearing medium 904 may encompass a recordable medium 910, such as, but not limited to, memory, read/write (R/W) CDs, R/W DVDs, etc. In some implementations, signal bearing medium 904 may encompass a communications medium 906, such as, but not limited to, a digital and/or an analog communication medium (e.g., a fiber optic cable, a waveguide, a wired communications link, a wireless communication link, etc.). Computer program product 900 may be recorded on non-transitory computer readable medium 908 or another similar recordable medium 910.

Figure 10:
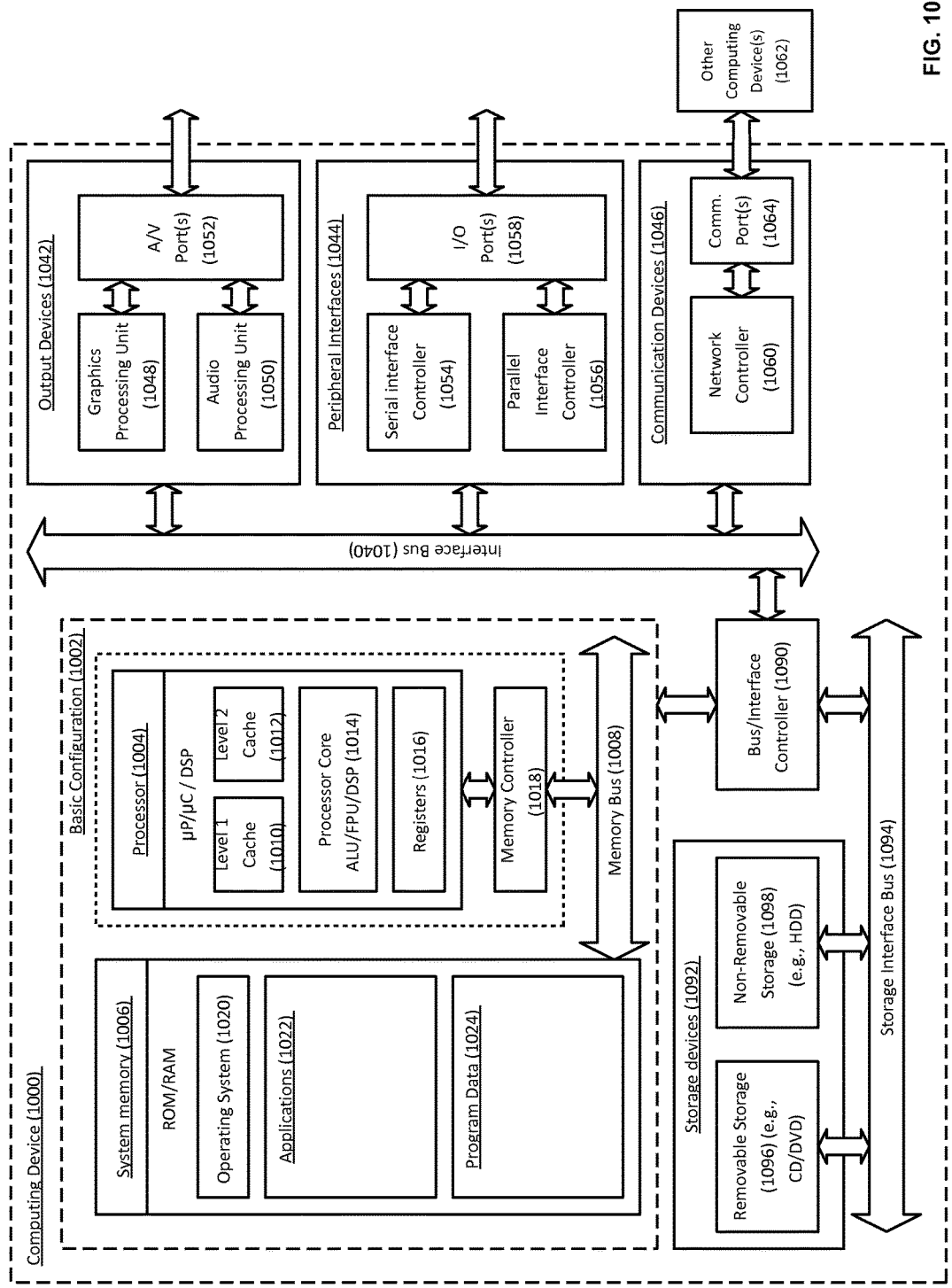
FIG. 10 is a block diagram illustrating an example computing device configured to operate using a chip multiprocessor, e.g., the chip multiprocessor in FIG. 1, all arranged in accordance with at least some embodiments of the present disclosure.

FIG. 10 is a block diagram illustrating an example computing device configured to operate using a CMP, e.g., CMP 100 in FIG. 1, in accordance with at least some embodiments of the present disclosure. In a very basic configuration 1002, computing device 1000 typically may include one or more processors 1004 and a system memory 1006. A memory bus 1008 may be used for communicating between processor 1004 and system memory 1006.

Depending on the desired configuration, processor 1004 may be of any type including but not limited to a microprocessor (µP), a microcontroller (µC), a digital signal processor (DSP), or any combination thereof. Processor 1004 may include one more levels of caching, such as a level one cache 1010 and a level two cache 1012, a processor core 1014, and registers 1016. An example processor core 1014 may include an arithmetic logic unit (ALU), a floating point unit (FPU), a digital signal processing core (DSP Core), or any combination thereof. Processor 1004 may include programmable logic circuits, such as, without limitation, FPGA, patchable ASIC, CPLD, and others. Processor 1004 may be similar to CMP 100 in FIG. 1. An example memory controller 1018 may also be used with processor 1004, or in some implementations memory controller 1018 may be an internal part of processor 1004.

Depending on the desired configuration, system memory 1006 may be of any type including but not limited to volatile memory (such as RAM), non-volatile memory (such as ROM, flash memory, etc.) or any combination thereof. System memory 1006 may include an operating system 1020, one or more applications 1022, and program data 1024. Program data 1024 may include data that may be useful for operation of computing device 1000. In some embodiments, application 1022 may be arranged to operate with program data 1024 on operating system 1020 to cause computing device 1000 to perform a method of transmitting data in a network on chip (NoC). This described basic configuration 1002 is illustrated in FIG. 10 by those components within the inner dashed line.

Computing device 1000 may have additional features or functionality, and additional interfaces to facilitate communications between basic configuration 1002 and any required devices and interfaces. For example, a bus/interface controller 1090 may be used to facilitate communications between basic configuration 1002 and one or more data storage devices 1092 via a storage interface bus 1094. Data storage devices 1092 may be removable storage devices 1096, non-removable storage devices 1098, or a combination thereof. Examples of removable storage and non-removable storage devices include magnetic disk devices such as flexible disk drives and hard-disk drives (HDDs), optical disk drives such as compact disk (CD) drives or digital versatile disk (DVD) drives, solid state drives (SSDs), and tape drives to name a few. Example computer storage media may include volatile and nonvolatile, removable and non-removable media implemented in any method or technology for storage of information, such as computer readable instructions, data structures, program modules, or other data.

System memory 1006, removable storage devices 1096 and non-removable storage devices 1098 are examples of computer storage media. Computer storage media includes, but is not limited to, RAM, ROM, EEPROM, flash memory or other memory technology, CD-ROM, digital versatile disks (DVDs) or other optical storage, magnetic cassettes, magnetic tape, magnetic disk storage or other magnetic storage devices, or any other medium which may be used to store the desired information and which may be accessed by computing device 1000. Any such computer storage media may be part of computing device 1000.

Computing device 1000 may also include an interface bus 1040 for facilitating communication from various interface devices (e.g., output devices 1042, peripheral interfaces 1044, and communication devices 1046) to basic configuration 1002 via bus/interface controller 1090. Example output devices 1042 include a graphics processing unit 1048 and an audio processing unit 1050, which may be configured to communicate to various external devices such as a display or speakers via one or more A/V ports 1052. Example peripheral interfaces 1044 include a serial interface controller 1054 or a parallel interface controller 1056, which may be configured to communicate with external devices such as input devices (e.g., keyboard, mouse, pen, voice input device, touch input device, etc.) or other peripheral devices (e.g., printer, scanner, etc.) via one or more I/O ports 1058. An example communication device 1046 includes a network controller 1060, which may be arranged to facilitate communications with one or more other computing devices 1062 over a network communication link, such as, without limitation, optical fiber, Long Term Evolution (LTE), 3G, WiMax, via one or more communication ports 1064.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Computing device 1000 may be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 1000 may also be implemented as a personal computer including both laptop computer and non-laptop computer configurations.

There is little distinction left between hardware and software implementations of embodiments of systems; the use of hardware or software is generally (but not always, in that in certain contexts the choice between hardware and software can become significant) a design choice representing cost vs. efficiency tradeoffs. There are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

I claim:

1. A network on chip (NoC), comprising:
  one or more memory controllers configured to manage data flow from a main memory associated with the NoC;
  a source node that includes:
    a processor core with an associated cache hierarchy; and
    a source router, wherein the source router includes:
      a crossbar switch; and
      a routing and arbitration controller; and
  a destination node communicatively coupled to the source node, wherein the destination node includes:
    a processor core with an associated cache hierarchy;
    a network device; and
    a destination router, wherein the destination router includes:
      a crossbar switch; and
      a routing and arbitration controller, wherein the destination router is configured to:
        receive a memory request from the network device for data to be transferred from the source node to the destination node; and
        transmit a connection setup message and the memory request to the source node, wherein the connection setup message and the memory request are transmitted as a combined message, wherein the memory request includes one or more physical memory addresses that correspond to a particular portion of the main memory from which the data, to be transferred from the source node to the destination node, is to be fetched by the source node, wherein the particular portion of the main memory is accessed by at least one of the one or more memory controllers, wherein the connection setup message includes at least one command effective to pre-reserve a circuit-switched connection to transfer the data from the source node to the destination node and effective to pre-reserve the source router for the pre-reserved circuit-switched connection, and wherein the at least one command effective to pre-reserve the source router comprises a first command effective to pre-reserve the source router for a first time period during which the source router is made unavailable for data transmission requested by a first node that is outside of the pre-reserved circuit-switched connection.

2. The NoC of claim 1, further comprising an intermediary node that is between the source node and the destination node, wherein the intermediary node includes an intermediary router, and wherein the at least one command included in the connection setup message is further effective to pre-reserve the intermediary router for the pre-reserved circuit-switched connection.

3. The NoC of claim 1, wherein the destination router includes a reservation register configured to track pre-reservation of the destination router over a specific period of time.

4. The NoC of claim 3, wherein the specific period of time is tracked in terms of clock cycles, and wherein the reservation register includes multiple bits that each track pre-reservation of the destination router for a particular set of clock cycles associated with the NoC.

5. The NoC of claim 3, wherein the specific period of time is based at least, in part, on a longest round-trip communication time that occurs between a particular node of the NoC and a memory controller coupled to the NoC.

6. The NoC of claim 3, wherein the specific period of time is based at least, in part, on a shortest round-trip communication time that occurs between a particular node of the NoC and a memory controller coupled to the NoC.

7. The NoC of claim 1, wherein the connection setup message includes a pre-reservation window that indicates a requested period of time to use the destination router.

8. The NoC of claim 7, wherein the pre-reservation window includes a safety margin based at least, in part, on at least one of an uncertainty in availability of the data at the source node and an uncertainty in transmission time of the connection setup message from the destination node to the source node.

9. The NoC of claim 7, wherein the destination router is further configured to compute the pre-reservation window based at least, in part, on an estimated time of availability of the data at the source node.

10. The NoC of claim 7, further comprising:
an intermediary node that is located along a circuit-switched path between the source node and the destination node, wherein the intermediary node includes an intermediary router, wherein the connection setup message includes a second command effective to pre-reserve the intermediary router, and wherein the destination router is further configured to determine a pre-reservation window for the intermediary router based at least, in part, on an estimated time of availability of the data at the source node.

11. The NoC of claim 7, wherein the pre-reservation window is based on one or more of a quantity of data associated with the memory request and a transmission time between the source node and the destination node.

12. A network on chip (NoC), comprising:
one or more memory controllers configured to manage data flow from a main memory associated with the NoC; and
a node, wherein the node includes:
a processor core with an associated cache hierarchy; and
a router disposed at the node, wherein the router includes:
a crossbar switch; and
a routing and arbitration controller, wherein the router is configured to:
receive a connection setup message that originates from a destination node of the NoC, wherein the connection setup message includes a reservation window that indicates a requested time frame to use the router in a circuit-switched connection for data to be transferred from a source node to the destination node;
receive a memory request from the destination node of the NoC, wherein the memory request includes one or more physical memory addresses that correspond to a particular portion of the main memory from which the data, to be transferred from the source node to the destination node, is to be fetched, wherein the particular portion of the main memory is accessed by at least one of the one or more memory controllers, and wherein the memory request is generated in response to a cache miss experienced by a network device located at the destination node or in response to a prefetch request executed by the network device;
determine availability of the router for use in the circuit-switched connection during the requested time frame; and
in response to a determination that the router is available during the requested time frame, reserve the router for use in the circuit-switched connection during the requested time frame, and transmit the connection setup message to the source node, wherein while the router is reserved for use during the requested time frame, the router is made unavailable for data transmission requested by a first node that is outside of the circuit-switched connection.

13. The NoC of claim 12, wherein the router is configured to transmit the connection setup message and an acknowledgement message to the source node, and wherein the source node is referenced in the connection setup message.

14. The NoC of claim 12, wherein the router is configured to add an acknowledgement message to the connection setup message and to transmit the acknowledgement message and the connection setup message as a single message.

15. The NoC of claim 12, wherein the circuit-switched connection comprises a circuit-switched connection between the source node and the destination node, and wherein the circuit-switched connection follows a same route in the NoC, but in an opposite direction, as that followed by the connection setup message.

16. The NoC of claim 12, further comprising other routers configured to perform circuit switching and packet switching.

17. A method to transmit data in a network on chip (NoC), the method comprising:
receiving a memory request from a network device included in a destination node of the NoC; and
transmitting a connection setup message for data to be transferred from a source node of the NoC to the destination node, wherein:
the memory request includes one or more physical memory addresses that correspond to a particular portion of a main memory, associated with the NoC, from which the data, to be transferred from the source node to the destination node, is to be fetched,
the particular portion of the main memory is accessed by at least one of one or more memory controllers of the NoC,
the memory request is generated in response to a cache miss experienced by the network device or in response to a prefetch request executed by the network device,
the connection setup message includes at least one command to pre-reserve a destination router and a source router for a circuit-switched connection from the source node to the destination node, and
the at least one command to pre-reserve the source router comprises a first command effective to pre-reserve the source router for a first time period during which the source router is made unavailable for data transmission requested by a first node that is outside of the circuit-switched connection.

18. The method of claim 17, wherein the connection setup message includes a second command to pre-reserve an intermediary node of the NoC that is located along a circuit-switched path between the source node and the destination node for the circuit-switched connection from the source node to the destination node.

19. The method of claim 17, wherein the destination node is co-located with the network device.

20. The method of claim 17, wherein the at least one command to pre-reserve the destination router comprises a second command effective to pre-reserve the destination router for a second time period during which the destination router is unavailable for data transmission requested by the first node, and wherein the first time period overlaps with no more than a portion of the second time period.

21. The method of claim 20, wherein the first time period does not overlap with the second time period.

22. A non-transitory computer readable storage medium that includes computer-executable instructions stored thereon, wherein the computer-executable instructions, in response to execution by a computer, cause the computer to perform or control performance of the method of claim 17.

23. The NoC of claim 1, wherein the at least one command effective to pre-reserve the circuit-switched connection comprises a second command effective to pre-reserve the destination router for a second time period during which the destination router is made unavailable for the data transmission requested by the first node.

24. The NoC of claim 23, wherein the first time period begins before the second time period begins.

25. The NoC of claim 1, wherein the routing and arbitration controller of the source node is further configured to:
receive acknowledgement messages from each node that makes up the circuit-switched connection; and
determine, based on the acknowledgement messages, whether all routers and links that form the circuit-switched connection are successfully pre-reserved.

26. The NoC of claim 1, wherein the routing and arbitration controller of the source node is further configured to:
after the circuit-switched connection is successfully pre-reserved, initiate a memory fetch of the data based on the memory request; and
transmit the fetched data to the destination node via the pre-reserved circuit-switched connection.

27. The NoC of claim 12, wherein the router is configured to receive the connection setup message and the memory request as a combined message.

28. The method of claim 17,
wherein the source node includes:
a processor core with an associated cache hierarchy; and
the source router, wherein the source router includes a crossbar switch, and
a routing and arbitration controller, and
wherein the destination node includes:
a processor core with an associated cache hierarchy; and
the destination router, wherein the destination router includes a crossbar switch, and a routing and arbitration controller.

29. The method of claim 17, wherein the connection setup message and the memory request are transmitted as a combined message.

* * * * *